Patented May 22, 1934

1,959,461

UNITED STATES PATENT OFFICE 1,959,461

SYMMETRICALLY SUBSTITUTED AZOBENZENE COMPOUNDS

Detlef Delfs, Leverkusen-I. G.-Werk, Germany, assignor to General Aniline Works, Inc., New York, N. Y., a corporation of Delaware No Drawing. Application October 12, 1932, Serial No. 637,558. In Germany October 17, 1931

5 Claims. (Cl. 260—96)

The present invention relates to the process of preparing symmetrically substituted azobenzene compounds and to the new products obtainable thereby, more particularly it relates to compounds which may be represented by the general formula:

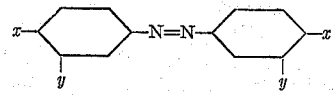

wherein "$x$" stands for halogen, the amino group or the hydroxy group, and "$y$" stands for the sulfonic acid or carboxylic acid group, and wherein the benzene nuclei may be further symmetrically substituted, for example by alkyl.

According to my invention the symmetrically substituted azobenzene compounds of the above identified formula are prepared by reducing in the usual manner in an alkaline aqueous medium a 1-nitro-4-halogenbenzene-3-sulfonic- or -carboxylic acid to the corresponding 4.4'-dihalogenazobenzene-3.3'-disulfonic- or -carboxylic acid, and if desired, substituting the 4.4'-halogen atoms by the amino- or hydroxy group according to methods known per se, for example, by heating in aqueous caustic soda or in aqueous ammonia respectively at an elevated temperature, say at a temperature between 130 and 180° C. with the addition of copper or a copper salt as catalyst.

A modification of my process resides in reducing the 1-nitro-4-halogenbenzene-3-carboxylic- or -sulfonic acids to the corresponding hydrazocompounds and oxidizing the same to the azo compounds, this modification of performing my new process being included in my invention.

The azo compounds prepared according to my invention are in form of their alkali metal salts generally yellow crystalline substances, soluble in water and are either themselves dyestuffs or are valuable intermediate products for preparing azodyestuffs.

The invention is illustrated by the following examples, without being limited thereto:

Example 1.—100 parts by weight of 5-nitro-2-chloro-benzene-1-carboxylic acid are dissolved in 400 parts by weight of water and 100 parts of aqueous caustic soda of 40° Bé.; then 100 parts by weight of zinc dust (90%) are slowly introduced with stirring in such a manner that the temperature does not exceed 50° C. When all the zinc dust has been introduced, the mixture is slowly heated to 90° C. in the course of 2 hours and stirring is continued at this temperature for about 8 hours. The reaction mixture is then filtered with suction, while still hot, the filter-residue is washed with water, and from the filtrate the sodium salt of the 4.4'-dichloroazobenzene-3.3'-dicarboxylic acid having in the free state the following formula:

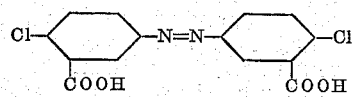

is precipitated by the addition of common salt. It is isolated by filtering with suction and heated with 400 parts by weight of water and 50 parts by weight of caustic soda with the addition of some copper powder (or a suitable copper compound) for about 10 hours in an autoclave at 150° C. From the orange-red solution the sodium salt of the 4.4'-dihydroxy-azobenzene-3.3'-dicarboxylic acid is separated by neutralizing the excess sodium hydroxide and salting out with common salt.

Example 2.—100 parts by weight of 5-nitro-2-chlorobenzene-1-sulfonic acid are introduced into 600 parts by weight of aqueous ammonia of 12% strength. Then 100 parts by weight of zinc dust (90%) are added by and by in such manner that the temperature does not exceed 60° C. The mixture is heated to 90° C. in the course of 2 hours, whereby the solution decolorizes. The reaction mixture is filtered with suction, and into the filtrate air is blown to oxidize the 4.4'-dichloro-hydrazobenzene-3.3'-disulfonic acid into the 4.4'-dichloroazobenzene-3.3'-disulfonic acid. The sodium salt of the azo compound having in its free state the following formula:

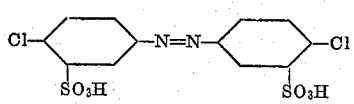

is separated by the addition of common salt. It is filtered with suction and heated in 400 parts by weight of ammonia of 15% strength for about 8 hours at about 160° C. The excess ammonia is driven off by heating, and the sodium salt of the 4,4'-diaminoazobenzene-3,3'-disulfonic acid having in the free state the following formula:

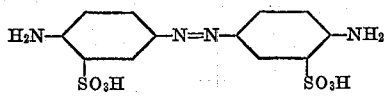

is precipitated by the addition of common salt. It is a yellowish powder, soluble in water with an intense yellow coloration, which, by the addition of a mineral acid, turns to red.

I claim:

1. In the process of preparing azo compounds of the general formula:

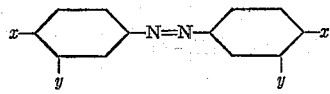

wherein "$x$" stands for the amino or hydroxy group and "$y$" stands for the sulfonic or carboxylic acid group, and wherein the benzene nuclei may further symmetrically be substituted by alkyl, the step which comprises reducing in an alkaline medium a 1-nitro-4-halogenbenzene-3-sulfonic- or -carboxylic acid which may be substituted by alkyl, into the corresponding azo compound.

2. The process of preparing azo compounds of the general formula:

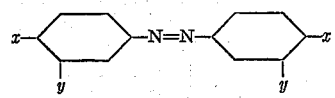

wherein "$x$" stands for the amino or hydroxy group and "$y$" stands for the sulfonic or carboxylic acid group, and wherein the benzene nuclei may further symmetrically be substituted by alkyl, which comprises reducing in an alkaline medium a 1-nitro-4-halogenbenzene-3-sulfonic- or -carboxylic acid which may be substituted by alkyl, into the corresponding azo compound, and substituting the halogen atoms in 4,4'-position by amino or hydroxy groups.

3. The compounds of the general formula:

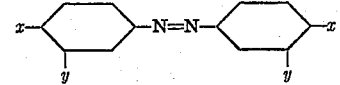

wherein "$x$" stands for chlorine or the amino group, "$y$" stands for a sulfonic- or carboxylic acid group, and wherein the benzene nuclei may further symmetrically be substituted by alkyl, being in the form of their alkali metal salts generally yellow crystalline substances, soluble in water and being valuable intermediate products for preparing azodyestuffs.

4. The compounds of the general formula:

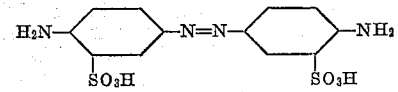

wherein the benzene nuclei may further symmetrically be substituted by alkyl, being in the form of their alkali metal salts generally yellow crystalline substances, soluble in water and being themselves dyestuffs or valuable intermediate products for preparing azodyestuffs.

5. The compounds of the general formula:

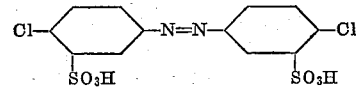

wherein the benzene nuclei may further symmetrically be substituted by alkyl, being in the form of their alkali metal salts generally yellow crystalline substances, soluble in water and being themselves dyestuffs or valuable intermediate products for preparing azodyestuffs.

DETLEF DELFS.